April 10, 1962     M. KOVARIK     3,029,331
THERMAL TRANSDUCERS

Filed Jan. 19, 1959     2 Sheets-Sheet 1

INVENTOR:
Mojmir KOVARIK
By Wenderoth, Lind & Ponack
Attys

April 10, 1962 M. KOVARIK 3,029,331
THERMAL TRANSDUCERS
Filed Jan. 19, 1959 2 Sheets-Sheet 2
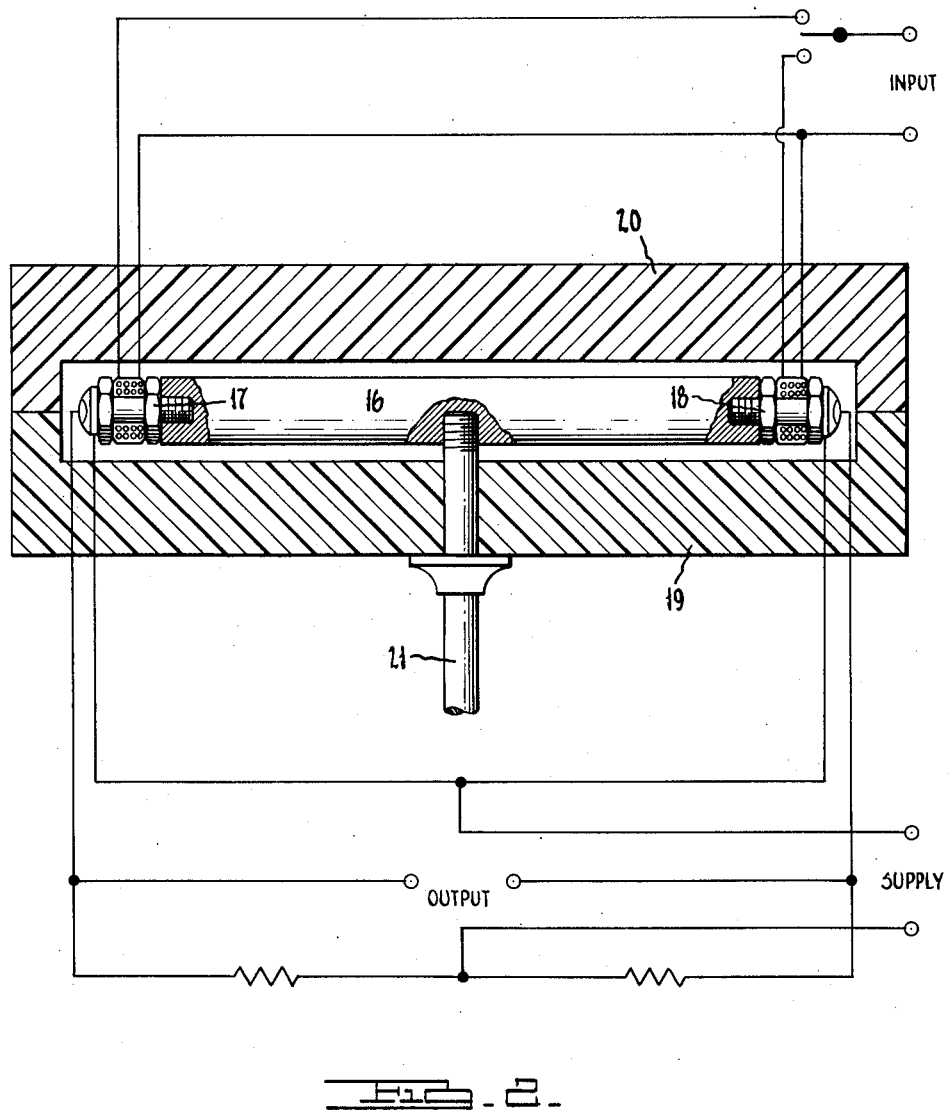
INVENTOR:
Mojmir KOVARIK
By: Wenderoth, Lind & Ponack
Attys

3,029,331
THERMAL TRANSDUCERS
Mojmir Kovarik, Moorabbin, Victoria, Australia, assignor to Commonwealth Scientific and Industrial Research Organization, East Melbourne, Australia, a corporation of Australia
Filed Jan. 19, 1959, Ser. No. 787,696
Claims priority, application Australia Jan. 22, 1958
5 Claims. (Cl. 219—20)

This invention relates to thermal transducers and has particular, though by no means exclusive, application to thermal transducers which may be used as stabilizing means for use in connection with either on-off or proportional control systems. In such cases the transducer will normally be used as an integrating element in a feed-back loop. Stabilizing means embodying the thermal transducers of the invention may be applied to many control systems to improve the accuracy of the control by the introduction of an integrating feed-back loop which, in spite of the long time constants obtainable, may be cheaply constructed.

In many control systems, particularly those which are required for accurate control, it is necessary to limit the oscillations of the controlled quantity. In order to reduce the oscillations of the controlled quantity, or in other words the hunting of the control system, it is frequently necessary to incorporate a stabilizing means in the form of an integrating device contained in a feed-back loop. The particular type of integrating feed-back device is determined by the requirement that its characteristics should be adjusted to suit those of the control system and those of the controlled device with which it is designed to operate.

It is known to provide a stabilizing means for control systems comprising a feed-back loop which includes an electrical integrating network. In such means the network is generally of the resistance capacitance type. However, the characteristics of many control systems and their associated controlled devices demand that, for optimum operation, the time constant of the integrating network be large. To satisfy this requirement, the elements composing the integrating network usually have to be massive and therefore expensive and bulky.

Accordingly therefore, an object of this invention is to provide a thermal transducer which will serve as an integrating device and which is applicable to a large variety of control systems.

The invention therefore comprises a thermal transducer having: a thermally conductive body, a plurality of spaced temperature sensing elements thermally connected to said body, and at least one electrically operated heater arranged in or on said body at a specific point so as to be in direct thermal connection with said body at that point, the electrical input to the heater comprising the input signal of the transducer and the output signal or signals of the transducer being dependent upon a combination of the outputs of the temperature sensing elements.

More particularly the thermal transducer may have: a homogeneous thermally conductive body of extended or elongated form, and an electrically operated heater arranged in or on each end of the body so as to be in direct thermal contact therewith, a plurality of temperature sensing elements thermally connected to said body at points spaced between said heaters, the transducer input and output being as above described. It may be desirable to divide the body of the thermal transducer into a body-mass or main portion and into a number of body-elements which carry the heaters and the temperature sensing elements of the transducer. In such a case the body-elements will be secured directly to the body-mass at the desired points thereon.

A particular embodiment thereof will now be described in order to exemplify a useful and valuable application of the principle of the invention. However, it is not the purpose of the following description to limit the invention to the particular application described, since the invention is applicable to widely differing fields of industrial and scientific technique.

An accurate temperature controller for maintaining the temperature of a liquid bath constant basically consists of a temperature sensing device situated in the liquid bath, an electrical heating element also situated in the liquid bath and a switch operable by the output of the sensing element to switch the heater on or off as the case requires. The sensing device may be a thermistor whose change in resistance is converted into an output voltage which, after amplification, becomes the input signal to the switch. The switch may preferably be an electronic switch of the type which has operating levels which can be accurately and permanently set, and which, when the input rises above one level or falls below another, effects the breaking or remaking of the electrical supply to the heater element.

In such a temperature control system periodic temperature fluctuations of the liquid bath may be observed during which the bath temperature rises above the upper level set by the electronic switch. This would occur even if an ideal thermometer and switch were to be used since it arises because the heater supply is switched off when the thermistor reaches the pre-set upper temperature limit. The temperature of the liquid bath will not fall immediately after the supply to the heater is switched off, since the "thermal inertia" of the heater will cause the temperature to continue the rise for a short time while the bath water absorbs the excess thermal energy from the heater element itself. It has been assumed in the above discussion that the bath is substantially the same temperature throughout being stirred continuously, and that it is well insulated from its environment.

It is necessary therefore, if the above-mentioned fluctuations are to be eliminated, to switch off the power supply to the heater element at sometime before the temperature of the bath reaches its upper level. Preferably, the power supply to the element is switched off when the extra thermal energy of the heater element is just enough to raise the bath temperature to the upper level. It may be seen therefore that an additional signal which takes into account the "thermal inertia" of the heater element could be added to the output signal of the thermistor bridge to obtain the desired effect. The thermal transducer of the invention may be used in a feed-back loop to provide such control since both the heater and the transducer are energy storing elements of similar characteristics. Therefore, the thermal transducer may be constructed so that its characteristics match those of the heater and bath arrangement. If the time constant of the heater is equal to that of the transducer, then the transducer's output may be made proportional to the potential overshoot of the controlled temperature. Accordingly, by suitable adjustment of the proportion in which the temperature signal from the thermistor bridge is mixed with the signal from the transducer, the electronic switch may be made to disconnect the power to the heater at a time when the energy stored will be just sufficient to bring the controlled temperature to the desired value without undesirable over-shoot. Furthermore, it is desirable that such a transducer should be physically independent of the bath so that it can be mounted with the rest of the electronic control system. Finally, the transducer should be constructed with the maximum degree of flexibility, that is, it should be capable of final adjustment so that its characteristics are closely matched to those of the temperature control system.

In the following description reference will be made to the accompanying drawings in which:

FIGURE 2 illustrates a transducer which is equivalent in operation to that of FIGURE 1 and is connected in a bridge circuit;

Figure 1:
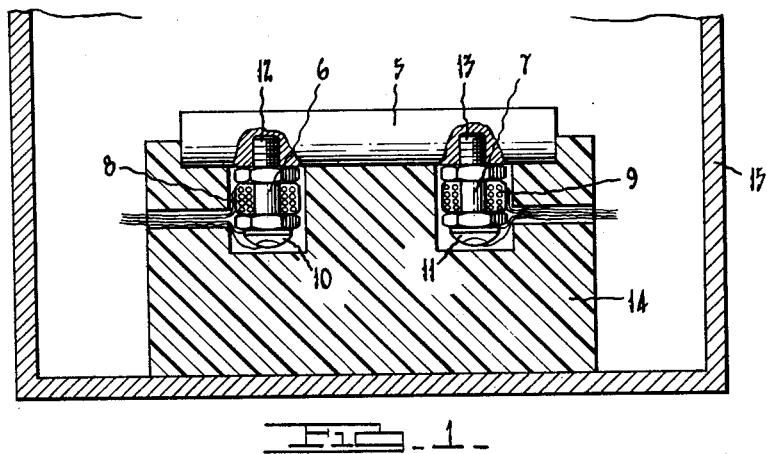
FIGURE 1 illustrates a transducer having two electrical heaters and two thermistors thermally connected by a common body.

FIGURE 1 illustrates a thermal transducer formed in accordance with the invention and having the desired properties. With reference to FIGURE 1, the transducer consists basically of a body-mass 5, body-elements 6 and 7, heater coils 8 and 9 and thermistors, 10 and 11. The body-elements 6 and 7 are detachably connected to the body-mass 5 by screws 12 and 13, so that they may be replaced by others of slightly different mass in order to obtain a final characteristics adjustment. Both body-mass 5 and body-elements 6 and 7 may be formed from a suitable metal such as brass. The use of a low melting point solder in addition or in place of the screws 12 and 13 may be desirable, particularly when excellent thermal conduction across the interface is essential. The transducer is supported in a suitably shaped block of insulating material 14 which prevents undesirable heat losses between the transducer and the fixture on which it rests. The top portion of the body-mass 5 is left uncovered so that heat may flow into the atmosphere which acts as a heat sink connected to the body-mass. In order to ensure that the loss to the atmosphere is substantially constant the transducer and insulating block 14 are placed inside a container 15 which merely serves the purpose of a draft excluder.

In operation, the input to the transducer shown in FIGURE 1 is a current flow in either, or in special cases both, of the heaters 8 and 9. The thermistors 10 and 11 are connected so as to form part of a bridge circuit, or other electrical network, so balanced that changes of resistance occurring in the thermistors 10 and 11 due to changes in their temperature caused by the applied heat flow constitute, by reason of the circuit, the desired output. The thermally conducting body of the transducer shown in FIGURE 1 is composed of the body-mass 5 and the body-elements 6 and 7 and although not homogeneous yet it is thermally continuous. The atmospheric heat sink is provided so that when a series of spaced input pulses are applied to the transducer its temperature will not keep rising indefinitely, as would be the case if no outlet was provided for the heat.

In order to obtain some degree of adjustment of the time constant of the transducer shown in FIGURE 1, the body-mass 5 may be replaced by other body-masses of greater or less weight. From a consideration of the smallest time constant required and the fact that the heater power should be as low as practicable, the body elements 6 and 7 are made as small as practicable and it has been found that heaters 8 and 9 having a maximum dissipation of 1 watt may be used together with small button-type thermistors 10 and 11 which are sweated onto the ends of the body-elements 6 and 7. It has been found that time constants ranging from one half to sixteen seconds may be readily obtained from a transducer such as that illustrated in this figure. It may also be desirable to use body-masses of different materials.

Another thermal transducer which is formed in accordance with the invention is illustrated diagramatically in FIGURE 2. Its operation and construction is substantially equivalent to that of the transducer shown in and described with reference to FIGURE 1. The body-mass 16 may be formed from brass and is rod-like, or, if desired, tubular having two body-elements 16 and 17 screwed and sweated to its ends. Each body-element may be constructed in a manner identical with those shown in FIGURE 1. The transducer is surrounded completely by insulating material forming two halves 19 and 20 of a container, while a heat sink is provided by the metallic rod 21 which is connected to a suitable fixture (not shown) and which may serve as support for the body-mass 16 and the insulating material 19. Once again, an adjustment of the mass of the body-mass 16 may be made in a similar manner to that described with respect to FIGURE 1.

The thermal transducer shown in FIGURE 2 has been connected in a simple and elementary manner to a bridge circuit. The input which supplies either one of the heaters may be switched on and off in synchronism with the heater which is immersed in the bath. A suitable voltage is taken from the supply terminals and applied to the thermistor bridge, one terminal being connected directly to the base of each thermistor and the other terminal being connected to the junction of the two resistors R1 and R2. The other terminal of the resistor R1 is connected to the center of one thermistor, while the other resistor R2 is connected in a similar manner to the other thermistor. The output signal is then taken from the junction of the resistor R1 with the center of the thermistor associated with the body-element 17 and from the junction of the resistor R2 and the body-element 18. The output of the thermistor bridge is therefore proportional to the difference in the resistances of the two thermistors and may be used as a feed-back signal to modify the control of the bath heater. Outputs of various forms may be obtained by using one or both heaters having the same or different signals, by varying the body-mass 16 and by varying the circuitry of the electrical network in which the thermistors are connected.

Figure 3:
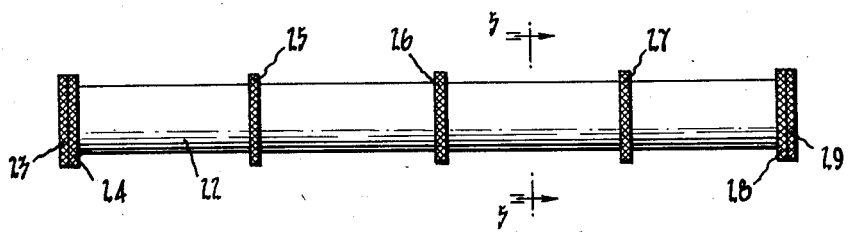
FIGURE 3 illustrates a transducer having more than two temperature sensing elements in the form of resistance thermometers.
Figure 4:
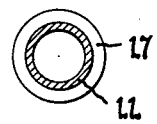
FIGURE 4 illustrates the transducer of FIGURE 3 viewed in section.

FIGURES 3 and 4 illustrate yet another embodiment of the invention, FIGURE 3 giving a general elevational view while FIGURE 4 giving a sectional view as indicated. The transducer illustrated in these figures is one which is particularly suitable for precise and predicable operation and yet is very flexible in its applications. The thermally conductive body of this transducer is in the form of a copper pipe 22 having five brass spools 24, 25, 26, 27 and 28 wound with suitable wire for use as resistance thermometers soldered onto it at regular intervals, and also having two identical brass spools 23 and 29 wound with suitable wire for use as heaters soldered onto its ends as shown. The pipe 22 should be homogeneous in composition and construction and should be uniform in its outside and inside diameters, since the theoretical heat flow and temperatures are then more easy to calculate.

Either by calculation or by calibration the response by each resistance thermometer to the application of heat at either one or both ends of the pipe may be obtained and by combining the response of selected thermometers with or without modification, a predicable and accurate transducer response may be obtained having the desired parameters. It has been found that a large variety of useful transducer responses are possible and that many of these would be most difficult to obtain by conventional methods. Although the mass of the thermally conductive body of this transducer cannot be readily varied, since it is not desirable to include thermal connections of doubtful quality, yet the variety of responses obtainable from the transducer by various combinations of the resistance thermometers is very large. The transducer of FIGURES 3 and 4 may be housed in suitable insulation in a manner similar to that illustrated in FIGURE 1 or FIGURE 2 or in any other desired manner.

Further modifications may be made to the various embodiments abovedescribed without departing from the scope of the invention, therefore, I do not wish to limit myself precisely to the embodiments described. For example responses of a different form may be obtained by thermally connecting the transducers shown in FIGURES 1, 2, 3 and 4 to a medium having a fluctuating temperature and which may be the controlled quantity.

It can be seen from the above description that the invention has not only provided a solution to the particular problem indicated but has provided a very flexible device capable of application to a wide field and a wide variety of problems.

I claim:

1. A thermal transducer comprising a body having good thermal conductivity, a plurality of spaced temperature sensing elements thermally connected to said body, and at least one electrically operated heater associated with said body at a specific point and in direct thermal connection with said body at that point, said heater being spaced from at least one of said temperature sensing elements sufficiently to cause substantially all of the heat from said heater which flows to said at least one temperature sensing element to flow through said body, whereby the electrical input to the heater constitutes the input signal of the transducer, and the output signal or signals of the transducer are made up of a combination of the outputs of the temperature sensing elements.

2. A thermal transducer comprising a thermally conductive body having a thermally conductive body-mass and at least two thermally conductive body-elements thermally connected directly to said body-mass at points spaced from one another, an electrically operated heater in direct thermal connection with each of said body-elements, a temperature sensing element direct thermal connection with each body-element, and an electrical network within which said temperature sensing elements are connected for responding to changes in the conditions of said temperature sensing elements due to temperature changes in said thermally conductive body caused by heat flow therein, whereby the electrical input to the heater or heaters constitutes the input signal of the transducer and the response of said electrical network constitutes or produces the desired output of the transducer.

3. A thermal transducer comprising a thermally conductive body having a thermally conductive body-mass and at least two thermally conductive body-elements in direct thermal connection to said body-mass at points spaced from one another, an electrically operated heater wound on each body-element, a thermistor secured to each body-element in direct thermal contact therewith, and a thermally insulating casing surrounding said body for mitigating irregular loss of heat from said body, whereby the electrical heater input constitutes the input signal of the transducer, and the output signal or signals of the transducer are made up of a combination of the output conditions of the thermistors.

4. A thermal transducer comprising a homogeneous thermally conductive body having an elongated shape, an electrically operated heater at each end of said body in direct thermal contact therewith, and a plurality of temperature sensing elements thermally connected to said body at points spaced between said heaters, said heaters being spaced from said temperature sensing elements sufficiently to cause substantially all of the heat from said heaters which flows to said temperature sensing elements to flow through said body, whereby the input to the transducer constitutes an electrical input signal to one or more of the heaters and the output of the transducer is made up of the conditions of two or more of the temperature sensing elements.

5. A thermal transducer for use in the conversion of a time-variable electrical input current into a related electrical output of predetermined character, said transducer comprising a thermally conductive body consisting of a metallic rod or tube of substantially uniform cross-section, an electrical heater winding on each end of said rod in direct thermal contact therewith and for receiving at least a portion of the electrical input, a plurality of resistance thermometer windings arranged on the rod between the heater windings at points spaced from one another and in direct thermal connection with said body, an output circuit to which at least two of the thermometer windings are connected so that changes in the resistances of the said windings will produce an electrical output in said circuit, and said transducer including a thermally insulating casing surrounding said body for substantially preventing irregular heat losses from said body.

References Cited in the file of this patent

UNITED STATES PATENTS

| | | |
|---|---|---|
| 2,386,903 | Lutomirski | Oct. 16, 1945 |
| 2,602,132 | Young | July 1, 1952 |
| 2,759,089 | Ellis | Aug. 14, 1956 |
| 2,767,296 | Welch | Oct. 16, 1956 |
| 2,774,854 | Stack | Dec. 18, 1956 |
| 2,841,329 | Statsinger | July 1, 1958 |
| 2,887,556 | Djinis et al. | May 19, 1959 |
| 2,898,434 | Lemmerman et al. | Aug. 4, 1959 |